Patented June 7, 1938

2,119,612

UNITED STATES PATENT OFFICE 2,119,612

FORM OF STORAGE FOR SWEET POTATOES AND OTHER VEGETABLE CROPS FOR INDUSTRIAL UTILIZATION

Francis H. Thurber, Arlington, Va.; dedicated to the free use of the People of the United States No Drawing. Application November 22, 1937, Serial No. 175,772

5 Claims. (Cl. 99—156)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the People of the United States to take effect on the granting of a patent to me.

My invention relates to the storage of vegetable crops for industrial purposes.

My invention is not limited to the storage of any one crop, but the details of the method hereinafter given apply particularly to sweet potatoes and to sweet potato storage.

It is the object of my invention to provide a form of storage for vegetables which will inhibit respiration, enzyme action and the action of microorganisms, thus making economically possible the extension of manufacturing plant operations beyond the normal root crop harvesting season. The loss of starch in some root crops such as cassava and sweet potatoes is so excessive with storage methods now in use that processing is recommended within 24 hours after removal of the roots from the ground.

Another object of my invention is to provide handling and storage facilities for root crops to be wet processed, which will reduce storage space costs and such other costs as drying and handling involved in some methods of storage. A further object is to recover sugars and other water-soluble products, which may be present in the storage crop.

With the above objects in view, I have set forth my invention in the following specification, and have indicated certain specific embodiments by way of illustration and not as a limitation.

Washed sweet potatoes are flushed into tanks or water-tight pits and are completely covered with water containing a suitable preservative. Solubles diffuse into the solution and water bearing the preservative enters the potato.

Sweet potatoes have been preserved under these conditions for an 8 months' period of time. For root crops, such as sweet potatoes, containing a high percentage of valuable solubles, the pits may be operated in a countercurrent manner. That is, as the solubles in the solution approach the concentration of the solubles remaining in the potato, the solution is transferred to a fresh supply of potatoes.

With a five-container countercurrent system and a four-day soaking period, the solution from the fifth container had a density of 3 Bé. For some commercial uses, it may be desirable to grind the product before preserving. In a run with sweet potatoes that had been stored in the air for 35 days, the potatoes were ground and leached in a five-container countercurrent system using four parts by weight of water to one of potatoes and a three-hour leaching period. Under these conditions the solution from the fifth container had a density of 5 Bé.

The type of preservative to be used is dependent upon the kind of material to be stored, and the purpose for which the material is to be used. In the storage of sweet potatoes for starch making purposes, 0.015% solutions of sulphur dioxide were found to be satisfactory for short periods of time. One-tenth percent solutions of high test hypochlorite also proved to be satisfactory.

For extended periods of storage "Dowicides", such as sodium-2-4-5-trichlor-phenate gave satisfactory results. Sweet potatoes were stored for eight months with this reagent, and also with paranitrophenol. Combinations of various reagents also proved to be effective. For example, a 45-day run was made with the Triumph variety of whole potatoes and a water solution containing 0.25% sodium-2-4-5-trichlor-phenate, 0.06% sulphur dioxide and 0.1% sodium silico fluoride. The solubles were not removed and the solution was sterile at the close of the storage period. The starch content of the potatoes at the beginning of the storage period was 26%, and at the close 23.4%. The potatoes lost 1.8% in weight during storage.

Another procedure consists in grinding the potatoes, removing the solubles with water containing an inexpensive preservative such as sulphur dioxide or chlorine, adjusting the hydrogen ion concentration to approximately seven with lime water, or other suitable reagent, followed by the addition of a preservative, such as sodium-2-4-5-trichlorphenate.

It will be understood that no restriction is made to the examples quoted which serve to illustrate the practical applications of my invention and that numerous modifications are possible within the meaning of the above description and the claims which follow.

Having thus described my invention, what I claim for Letters Patent is:

1. A method for the removal of solubles from sweet potatoes, which comprises subjecting the sweet potatoes to the action of water in the presence of a suitable preservative, followed by the adjustment of the hydrogen ion concentration to approximately pH 7, followed by storage in the presence of sodium-2-4-5-trichlorphenate.

2. A method for the removal of solubles from sweet potatoes, which comprises subjecting the sweet potatoes to the action of water in the presence of chlorine followed by the adjustment of the hydrogen ion concentration to approximately pH 7, followed by storage in the presence of sodium-2-4-5-trichlorphenate.

3. A method for the removal of solubles from sweet potatoes, which comprises subjecting the sweet potatoes to the action of water in the presence of sulphur dioxide followed by the adjustment of the hydrogen ion concentration to approximately pH 7, followed by storage in the presence of sodium-2-4-5-trichlorphenate.

4. In the storage of root crops without the removal of solubles, comprising immersing root crops in a preservative consisting of water; sodium-2-4-5-trichlorphenate; sulphur dioxide, and sodium silico fluoride, at suitable concentrations.

5. In the storage of root crops without the removal of solubles, comprising immersing root crops in a preservative consisting of water containing 0.025% sodium-2-4-5-trichlorphenate, 0.06% sulphur dioxide and 0.1% sodium silico fluoride.

FRANCIS H. THURBER.